(12) United States Patent
Skifter (10) Patent No.: US 11,306,704 B2
(45) Date of Patent: Apr. 19, 2022

(54) WIND TURBINE POWERTRAIN CONNECTION

(71) Applicant: Vestas Wind Systems A/S, Aarhus N. (DK)

(72) Inventor: Lars Skifter, Randers Sø (DJ)

(73) Assignee: Vestas Wind Systems A/S, Aarhus N. (DK)

( * ) Notice: Subject to any disclaimer, the term of this patent is extended or adjusted under 35 U.S.C. 154(b) by 336 days.

(21) Appl. No.: 16/475,870

(22) PCT Filed: Dec. 11, 2018

(86) PCT No.: PCT/DK2018/050343
§ 371 (c)(1),
(2) Date: Jul. 3, 2019

(87) PCT Pub. No.: WO2019/238179
PCT Pub. Date: Dec. 19, 2019

(65) Prior Publication Data
US 2021/0332795 A1 Oct. 28, 2021

(30) Foreign Application Priority Data

Jun. 14, 2018 (DK) .......................... PA 2018 70391

(51) Int. Cl.
*F03D 13/10* (2016.01)
*F03D 15/10* (2016.01)
(Continued)

(52) U.S. Cl.
CPC ............. *F03D 15/10* (2016.05); *F03D 13/10* (2016.05); *F03D 13/20* (2016.05); *F03D 80/50* (2016.05);
(Continued)

(58) Field of Classification Search
CPC ................................ F03D 13/10; F03D 15/10
See application file for complete search history.

(56) References Cited

U.S. PATENT DOCUMENTS 7,944,079 B1 * 5/2011 Signore .................. F03D 80/50
290/55
8,210,810 B2 * 7/2012 Egoshi ...................... F03D 1/06
416/1
(Continued)

FOREIGN PATENT DOCUMENTS

| CN | 104653647 A | 5/2015 |
| DE | 102011084154 A1 | 4/2013 |

(Continued)

OTHER PUBLICATIONS

Danish Patent and Trademark Office, Search Report issued in PA 2018 70391, dated Jun. 7, 2019 (7 pages).
(Continued)

*Primary Examiner* — Woody A Lee, Jr.
*Assistant Examiner* — Behnoush Haghighian
(74) *Attorney, Agent, or Firm* — Wood Herron & Evans LLP (57) ABSTRACT

A powertrain for a wind turbine (100) comprises at least a first powertrain component (21, 22, 23, 26) and a second powertrain component (21, 22, 23, 26). A rotating output of the first powertrain component (21, 22, 23, 26) is coupled to a rotating input of the second powertrain component (21, 22, 23, 26) and a powertrain housing enclosing the powertrain components (21, 22, 23, 26), the powertrain housing comprising at least a first powertrain housing section (211, 221, 231, 261) enclosing at least part of the first powertrain component (21, 22, 23, 26) and a second powertrain housing section (211, 221, 231, 261) enclosing at least part of the second powertrain component (21, 22, 23, 26). A connection between the first and the second powertrain housing sections
(Continued)

(211, 221, 231, 261) comprises a plurality of bolts (42) installed in corresponding bolt holes (421) of the first and the second powertrain housing sections (211, 221, 231, 261), and a plurality of dowel pins (43) installed in corresponding dowel pin holes (431) of the first and the second powertrain housing sections (211, 221, 231, 261), the dowel pins (43) having been installed in the dowel pin holes (431) by shrink fitting.

16 Claims, 6 Drawing Sheets

(51) Int. Cl.
*F03D 80/50* (2016.01)
*F03D 13/20* (2016.01)

(52) U.S. Cl.
CPC ....... *F05B 2220/30* (2013.01); *F05B 2230/60* (2013.01); *F05B 2260/40* (2013.01)

(56) References Cited

U.S. PATENT DOCUMENTS

| | | | | |
|---|---|---|---|---|
| 8,500,400 | B2* | 8/2013 | Signore | F03D 15/00 416/1 |
| 8,556,591 | B2* | 10/2013 | Koronkiewicz | F03D 80/70 416/244 R |
| 2008/0309091 | A1 | 12/2008 | Hahlbeck | |
| 2010/0007150 | A1 | 1/2010 | Ciszak et al. | |
| 2011/0138731 | A1* | 6/2011 | Yoshimura | F03D 13/22 52/651.01 |
| 2011/0142626 | A1* | 6/2011 | Hanson | F03D 7/0204 416/9 |
| 2012/0045340 | A1* | 2/2012 | Rolling | F03D 7/0268 416/220 R |
| 2013/0001954 | A1* | 1/2013 | Garc A Maestre | E02D 27/425 290/55 |
| 2013/0187390 | A1 | 7/2013 | Smook et al. | |
| 2014/0302957 | A1 | 10/2014 | Boing et al. | |
| 2014/0348663 | A1* | 11/2014 | Schacknies | F03D 13/00 416/244 R |
| 2014/0356184 | A1* | 12/2014 | Ebbesen | F03D 13/20 416/244 R |
| 2016/0298597 | A1* | 10/2016 | Macik | B25B 27/04 |
| 2016/0305397 | A1* | 10/2016 | Ohl, Jr. | F03D 80/50 |
| 2017/0023125 | A1* | 1/2017 | Diekhans | F16H 57/082 |
| 2019/0017552 | A1* | 1/2019 | Vanderwalker | B23P 6/002 |
| 2019/0071862 | A1* | 3/2019 | White | E04H 12/12 |
| 2019/0170122 | A1* | 6/2019 | Longeru | E04H 12/12 |
| 2019/0356191 | A1* | 11/2019 | Simonsen | H02K 11/00 |

FOREIGN PATENT DOCUMENTS

| | | |
|---|---|---|
| EP | 2630369 A1 | 8/2013 |
| EP | 2808545 A1 | 12/2014 |
| WO | 2010005790 A2 | 1/2010 |

OTHER PUBLICATIONS

International Searching Authority, Search Report and Written Opinion issued in Interantional Application No. PCT/DK2018/050343, dated Mar. 11, 2019 (14 pages).

* cited by examiner

WIND TURBINE POWERTRAIN CONNECTION

FIELD OF THE INVENTION

The invention relates to a powertrain for a wind turbine comprising at least a first powertrain component and a second powertrain component, a rotating output of the first powertrain component being coupled to a rotating input of the second powertrain component and a housing of the first powertrain component being connected to a housing of the second powertrain component. The invention further relates to a method for connecting a first wind turbine powertrain component to a second wind turbine powertrain component.

BACKGROUND OF THE INVENTION

Wind turbine powertrains convert a low speed rotation of a wind powered rotor hub to a higher speed rotation of an input shaft for an electric generator. An important component of the powertrain is the gearbox. The gearbox typically comprises a number of gearbox stages for a stepwise increase of the rotational speed. The gearbox stages are enclosed by a gearbox housing. At the input of the gearbox, a low speed input shaft couples the gearbox to the rotor hub. A main bearing supports the rotating shaft and the hub rotation. In some wind turbines, part of the low speed shaft and a coupling element between the low speed shaft and the gearbox input are enclosed by a coupling housing.

The connections between the gearbox housing and the coupling housing are generally provided by a plurality of bolts extending through the housings to be connected. For optimal torque transfer in the powertrain it is important that subsequent power train components are well aligned and that the connections between them are tight and permanent. However, due to vibrations and the large torques in the powertrain of an operating wind turbine, over time bolts may come loose or even break. When the first bolts come loose, the situation may quickly worsen. When the two housings are not tightly connected, this may also result in reduced torque transfer between the two powertrain components. In some wind turbines, the main bearing housing is supported on a pedestal on the nacelle floor, with the coupling element, the gearbox and the generator attached thereto in a cantilever arrangement. In such an arrangement, the main bearing housing, coupling housing, gearbox, and generator are bolted together with flange connections and mounted on the main frame as a cantilever arrangement. Typically, the bending moments caused by the weight of the components and the torques caused by nacelle accelerations are taken by the bolts in the flange connections. The torque transfer in the flange connections will typically also be taken by the friction resulting from the bolt pre-tensioning. Because of the weight of especially the gearbox and the generator and the high torques that are associated with the operation of the wind turbine, such an arrangement causes additional stress on the bolts connecting the housings of the different power train components.

To avoid these problems, regular maintenance operations are needed to replace broken bolts and tighten the loose ones. Maintenance is a time-consuming and expensive activity and usually requires interruption of the energy production by the wind turbine. This is especially a problem for off-shore wind turbines that are more difficult to reach and generally produce more power, which means that more energy is 'lost' by interrupting energy production.

A known approach for strengthening the connections between two wind turbine powertrain component housings is to just use more and bigger bolts. The bolts are usually installed in a circular flange surrounding the rotational shaft. The success of this approach is, however, limited by the radius of the circular flange. When most of the flange is already occupied by bolts, adding more will only be possible by providing a larger housing.

Considering the above indicated problems in current wind turbine powertrains, it is an object of the invention to improve the connections between the housings of different wind turbine powertrain components.

SUMMARY OF THE INVENTION

According to the invention this object is achieved by providing a powertrain for a wind turbine comprising at least a first powertrain component and a second powertrain component, a rotating output of the first powertrain component being coupled to a rotating input of the second powertrain component and a powertrain housing enclosing the powertrain components. The powertrain housing comprises at least a first powertrain housing section enclosing at least part of the first powertrain component and a second powertrain housing section enclosing at least part of the second powertrain component. A connection between the two powertrain housing sections comprises a plurality of bolts installed in corresponding bolt holes of the two powertrain housing sections, and a plurality of dowel pins installed in corresponding dowel pin holes of the two powertrain housing sections, the dowel pins being installed in the dowel pin holes by shrink fitting.

Using such a connection between two powertrain housing sections leads to a more even load distribution and may help to avoid micro movements between the housing sections and fretting corrosion in, e.g., the flanges or the pin holes. When bolts and shrink-fit dowel pins are combined as claimed, the bolts will typically take the bending moments caused by the weight of the powertrain components, while the dowel pins take all the shear forces from the torque exerted on the power train housing.

Shrink fitting is a known technique for, e.g., industrial pipe work or the installing of bearings. With shrink fitting, an interference fit is achieved by a relative size change after assembly. This is usually achieved by heating or cooling one component before assembly and allowing it to return to the ambient temperature after assembly, employing the phenomenon of thermal expansion to make a joint. For example, the thermal expansion of a piece of a metallic drainpipe allows a builder to fit the cooler piece to it. As the adjoined pieces reach the same temperature, the joint becomes strained and stronger. Until now, shrink fitting has not been considered for the purpose of providing a tight connection between the housing sections enclosing two interconnected wind turbine powertrain components.

The dowel pins may, e.g., be installed by using a guide tool for gripping the dowel pin and inserting the dowel pin into a bath of liquid nitrogen. The dowel pin is then slid into one of the dowel pin holes, where it will expand and establish a tight grip on the housing sections enclosing both powertrain components. These shrink fit connections are stronger and more permanent than the already known bolt connections and therefore allow to increase the tightness of the fit and to considerably reduce the maintenance work that has to be done, without the need to provide a larger diameter powertrain housing.

Preferably, the dowel pins comprise an engagement feature for allowing the dowel to be gripped by a guide tool when the dowel pins are installed in the dowel pin holes. The engagement features may, e.g., comprise one or more threaded or non-threaded holes. When gripping the dowel pin with the guide tool, the guide tool can be used to dip the dowel pin into a cryogen bath and/or to push it into one of the dowel pin holes. The threaded hole may also be used for facilitating the removal of the dowel pin when disassembling (part of) the powertrain with the help of a hollow hydraulic cylinder and a threaded rod that is mounted in the threaded hole.

For an optimal distribution of all mechanical forces working on the powertrain housing sections, the plurality of bolts may be arranged in a substantially circular arrangement around the rotating output and/or input.

For easy access of the bolts and dowel pins and for having a large surface area for establishing the connection, the first powertrain housing section and/or the second powertrain housing section may comprise a substantially circular flange and the plurality of bolts may be arranged in the circular flange.

Preferably, at least some of the dowel pins are provided at a position in between two of the bolts. The dowel pins are not necessarily part of the circle formed by the bolts, but having the dowel pins installed close to and in line with the bolts will reduce the stress exerted on the bolts. For example, at least some of the dowel pins are provided at positions in between two pairs of the bolts. In such an arrangement there will be roughly twice as many bolts as dowel pins. Every dowel pin in the connection circle is followed by two bolts. Alternatively, one of the dowel pins is provided between each pair of adjacent bolts.

The improved connection according to the invention may, e.g., be provided between a gearbox and a powertrain component other than a gearbox, such as between a low speed shaft coupling housing and a gearbox housing, or between a gearbox housing and a generator housing. But it should be clear that the invention is not limited to these connections and can also be used for connecting other wind turbine powertrain components. For instance, one or both of the first and second powertrain housing sections may be an intermediate powertrain housing section. With the term intermediate powertrain housing section is meant a powertrain housing section, which is not intended to have a specific element inside, but just to couple two other housing sections. In particular this could be a coupling of the housing sections of the main bearing housing and the gearbox housing.

According to a second aspect of the invention, a method for connecting a first wind turbine powertrain component to a second wind turbine powertrain component is provided. The method comprises the steps of aligning the first powertrain component with the second powertrain component, inserting at least one bolt into a bolt hole in a first powertrain housing section enclosing at least part of the first powertrain component and into a corresponding bolt hole in a second powertrain housing section enclosing at least part of the second powertrain component, fastening the bolt, shrink fitting a dowel pin in a dowel pin hole in the first powertrain housing section and into a corresponding dowel pin hole in the second powertrain housing section.

The step of aligning may be assisted by inserting at least one guide pin, already connected to the first powertrain housing section into a guide hole of the second powertrain housing section, or vice versa. The guide pins may be an integral part of one of the housing sections and/or may be installed prior to aligning the two sections. According to a special embodiment of the invention, the guide pin is connected to one of the powertrain housing sections by inserting the guide pin into one of its dowel pin holes. A corresponding dowel pin hole in the other powertrain housing sections then functions as the guide hole and receives the guide pin during the alignment of the two housing sections. When the two housing sections are aligned, preferably after a few bolts have already been inserted (not necessarily fully tightened), the guide pin is then removed from the dowel pin hole for allowing a dowel pin to be fitted therein.

It will be appreciated that preferred and/or optional features of the first aspect of the invention may be combined with the other aspects of the invention. The invention in its various aspects is defined in the independent claims below and advantageous features are defined in the dependent claims below.

BRIEF DESCRIPTION OF THE DRAWINGS

For a better understanding of the invention, some embodiments of the invention will now be described with reference to the following drawings, in which.

DETAILED DESCRIPTION

Figure 1:
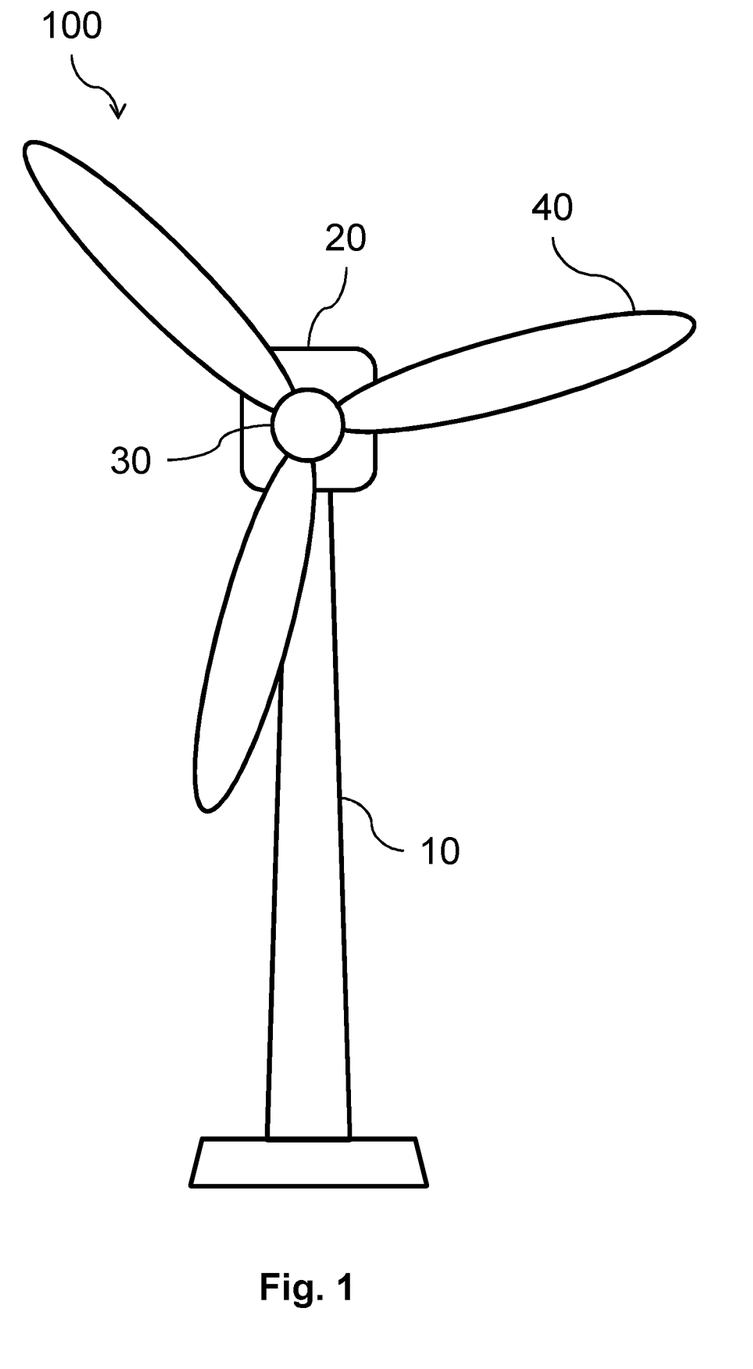
FIG. 1 schematically shows a wind turbine in which the current invention could be advantageously used.

FIG. 1 schematically shows a wind turbine 100 in which the current invention could be advantageously used. The wind turbine 100 comprises a tower 10 with on top thereof a nacelle 20, comprising many of the functional parts of the wind turbine 100. A rotor hub 30 is rotatably mounted to the front end of the nacelle 20 and carries a number of rotor blades 40. The wind turbine 100 shown here comprises three rotor blades 40, but wind turbines with more or less rotor blades 40 are also possible. The wind turbine 100 produces electrical energy by turning (yawing) the nacelle 20 such that the plane in which the rotor blades 40 rotate is positioned more or less perpendicular to the direction of the wind. In the nacelle 20, a generator is used for converting the hub rotation into electricity.

Figure 2:
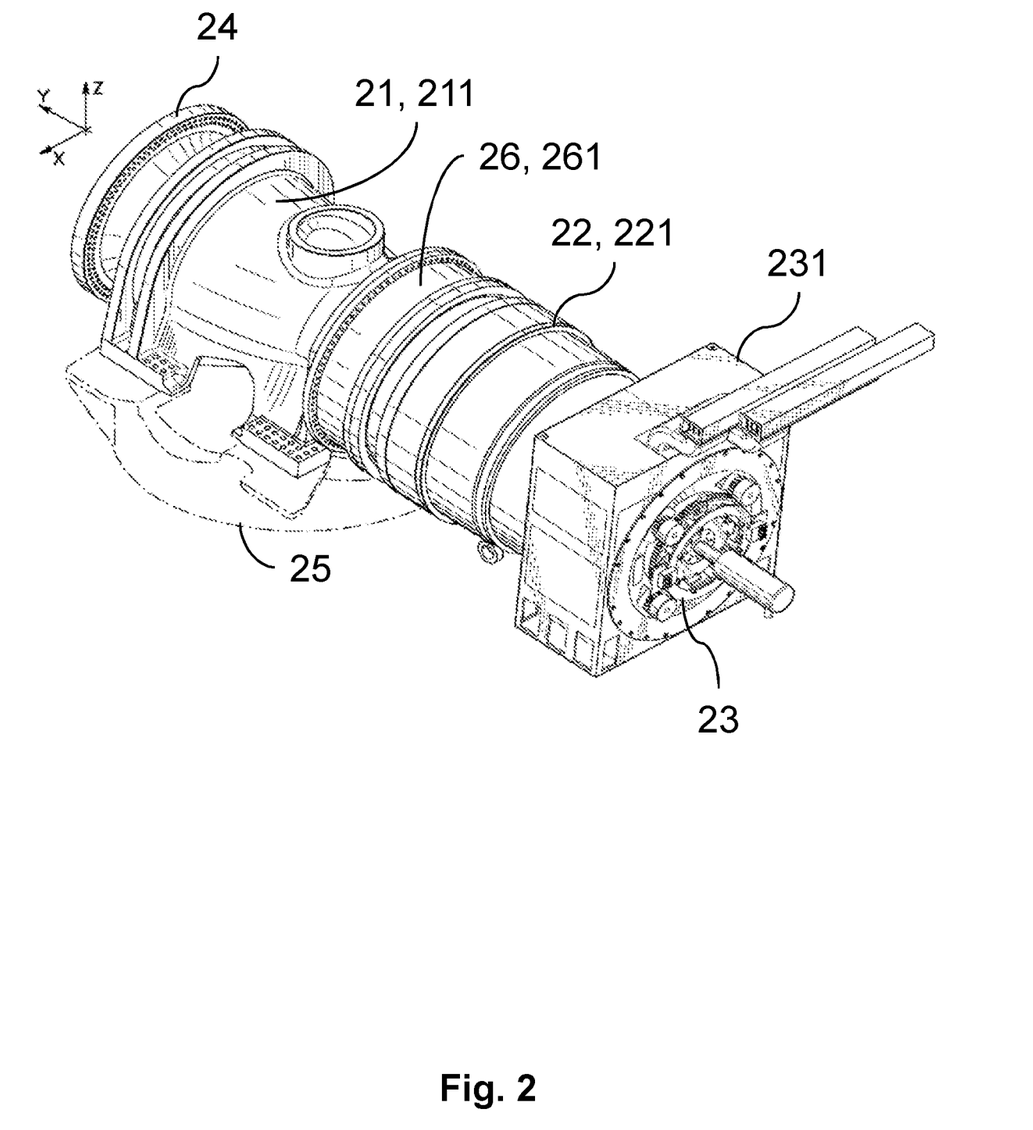
FIG. 2 shows a closer view on part of the wind turbine powertrain.

FIG. 2 shows closer view on part of the wind turbine powertrain. In operation, wind causes the rotor blades 40 and the rotor hub 30 (both not shown in this figure) to rotate. A powertrain, being enclosed by the nacelle 20 converts the rotation of the rotor hub 30 into electrical power. Power cables run from the powertrain, down through the tower 10, to the ground, where the electrical power may be used, stored in a battery or transferred to an electrical grid. The powertrain of this wind turbine 100 comprises a main bearing 21, provided for supporting the main shaft 24, also called low speed shaft 24, with the rotor hub 30 attached thereto and facilitating its rotation. The low speed shaft 24, rotating together with the rotor hub 30, forms the input of a subsequent gearbox 22. The low speed input shaft 24 is coupled to the gearbox input by a coupling 26. The main bearing 21, the coupling 26 and the gearbox 22 are each enclosed by a housing 211, 261, 221. The housings 211, 261, 221 of subsequent powertrain components 21, 26, 22 are also connected together. In FIG. 2, only the housings 211, 261, 221 of these powertrain components 21, 26, 22 can be seen. The reference numbers referring to the main bearing 21, the coupling 26 and the gearbox 22 therefore also point to the housings 211, 261, 221 of the respective powertrain components 21, 26, 22.

In the gearbox 22, the rotational speed of the low-speed rotor hub 30 at the gearbox input is converted into a higher rotational speed for the electrical generator 23 at the gearbox output. The gearbox 22 typically comprises multiple sections for increasing the rotational speed in two or more steps. The gearbox sections together form a single gearbox unit 22 that is enclosed by a gearbox housing 221. An electrical generator 23 turns the rotary power of the high speed gearbox output shaft into useful electrical power that is then transported down through the wind turbine tower 10. In this powertrain, the housing 231 of the electrical generator 23 is bolted to the gearbox housing 221. Alternatively, a second coupling may be installed between the gearbox 22 and the generator 23. This second coupling may be enclosed by a second coupling housing. Alternatively, this second coupling is fully or partly enclosed by extending portions of the gearbox housing 221 and/or the generator housing 231. It is to be noted, that a coupling housing 261 may also be provided in between the main bearing housing 211 and the gearbox housing 221 or between any other two powertrain components, even if there is no separate powertrain component enclosed by such a coupling housing 261. E.g., the main bearing housing 211 may be directly connected to the gearbox 22, while a coupling housing 261 couples the main bearing housing 211 to the gearbox housing 221.

In this exemplary powertrain, adapted for use in a large offshore wind turbine, the main bearing housing 211 is supported on a pedestal 25 standing on the nacelle floor. The coupling 26, gearbox 22 and generator 23 are all cantilevered from the main bearing housing 211. For such a construction to support the heavy gearbox 22 and generator 23, it is important to have a strong connection between the main bearing housing 211 and the coupling housing 261 as well as between the coupling housing 261 and the gearbox housing 221.

In the following, the connection between the coupling housing 261 and the gearbox housing 221 is described in more detail. However, the invention is not limited to this particular connection between powertrain components and is, e.g., also applicable to the main bearing housing 211 to coupling housing 261 connection and/or for connections between the gearbox housing 221 and the generator housing 231. It is further noted that separate sections of the powertrain housing may, as described below, enclose separate powertrain components. However, it is also possible for a powertrain housing section to only enclose a portion of the powertrain component. The housing section enclosing the subsequent powertrain component may then have an extended portion for covering the not yet enclosed portion of the preceding powertrain component. Alternatively, an intermediate powertrain housing section may couple the housing sections enclosing two adjacent powertrain components. Both such connections to an intermediate powertrain housing section may use the inventive concept as described herein.

Figure 3:
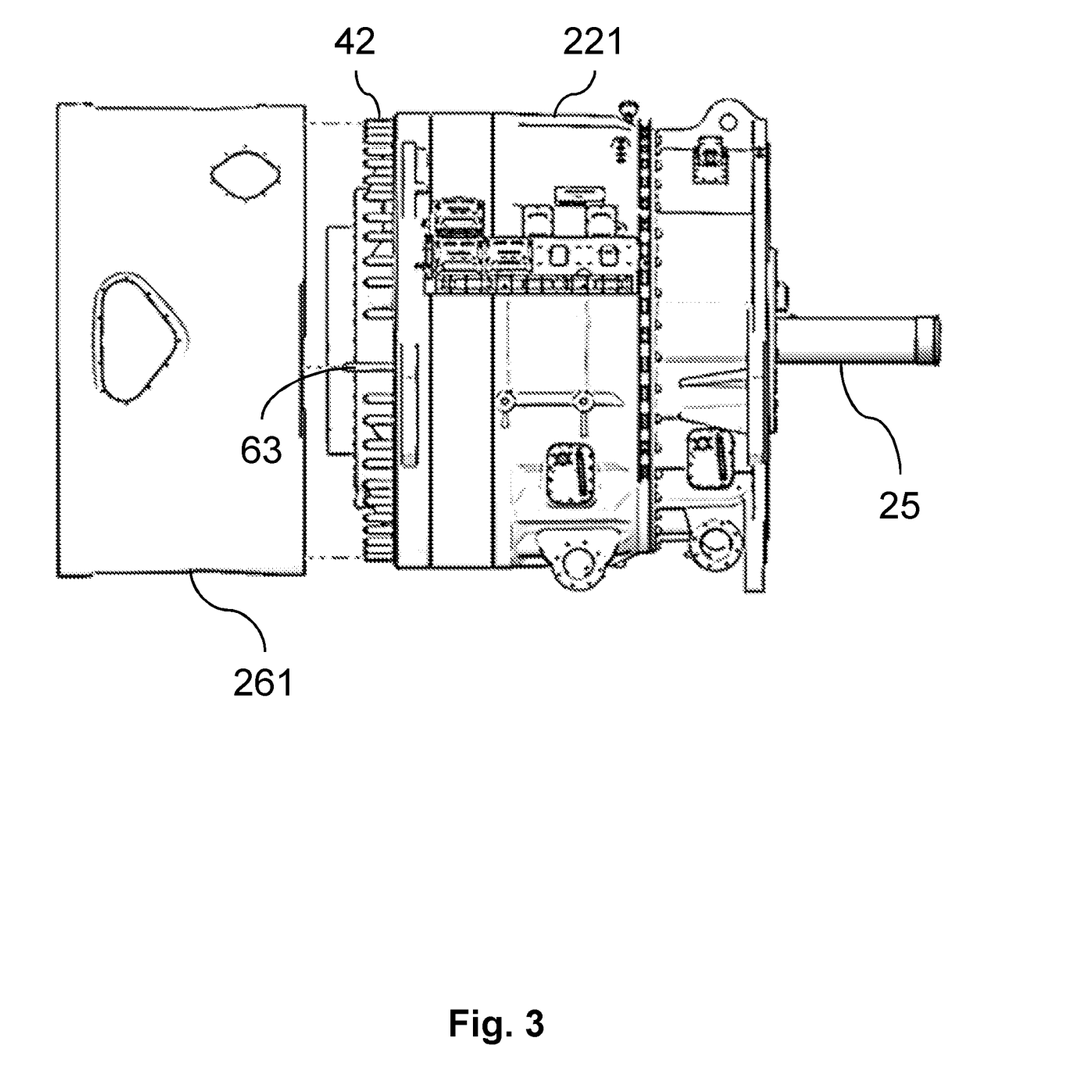
FIG. 3 shows a coupling being aligned with a gearbox housing.

FIG. 3 shows a gearbox 22 being aligned with the coupling housing 261. Here, the coupling housing 261 may already be connected to the main bearing housing 211 when a crane is used to bring the gearbox 22 close to the opposing end face of the coupling housing 261. In an embodiment, the coupling housing 261 and the gearbox housing 221 are connected together first, before they are connected to the main bearing housing 211. This connection between the coupling housing 261 and the gearbox housing 221 can already be made in the factory, far away of the location where the wind turbine 100 will be placed. Guide pins 63 that are an integral part of the gearbox housing 221, or have just been inserted therein, indicate where the corresponding guide holes (not shown) in the coupling housing 261 have to be located for enabling attaching the gearbox housing 221 to the coupling housing 261. The guide holes in the coupling housing 261 may be dedicated holes that are only used in the alignment phase. Alternatively, the guide pins 63 are inserted into a dowel pin hole or a bolt hole of the gearbox housing 221 and will be removed later in the connection process. In this drawing, the bolts 42 are shown to have already been inserted in the bolt holes of the gearbox housing 221 before the two housings 221, 261 are properly aligned, but they can also be provided later, after the alignment phase. Of course, it is equally possible to have the guide pins 63 sticking out of the coupling housing 261 and to align those guide pins 63 with guide holes, dowel pin holes 431 or bolt holes 421 in the gearbox housing 221.

Figure 4:
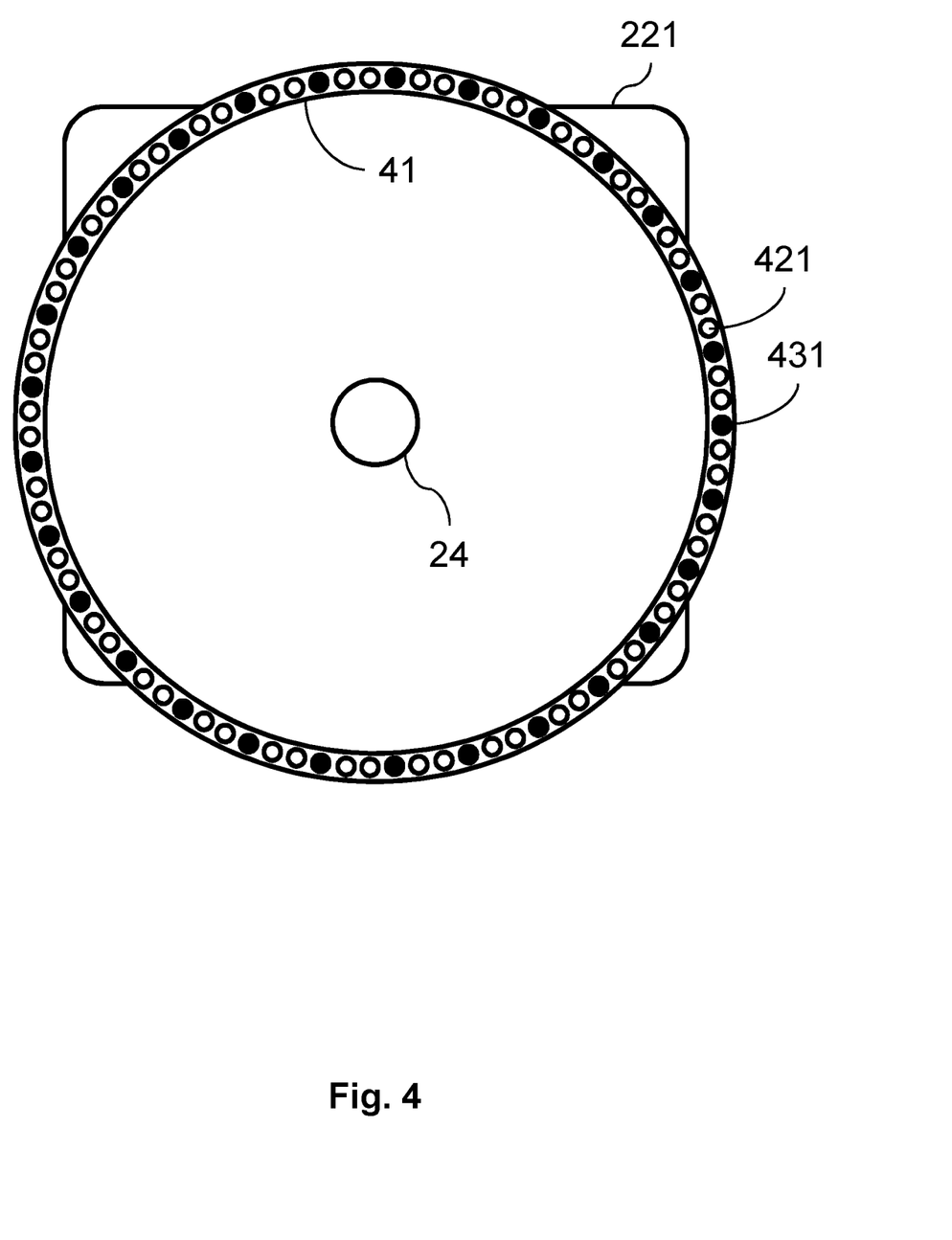
FIG. 4 shows a front view of the gearbox of a wind turbine powertrain according to the invention.

FIG. 4 shows a front view of the gearbox 22 of a wind turbine powertrain 100 according to an embodiment of the invention. The gearbox housing 221 comprises a circular flange 41 with bolt holes 421 and dowel pin holes 431 arranged all around the flange 41. One or more of these holes 421, 431 may be used as a guide hole during the alignment phase. A visual marker may be used for indicating which hole 421, 431 is to be used as a guide hole. Similarly, the corresponding guide hole in the coupling housing 261 may be visually marked. In this embodiment, twice as many bolt holes 421 as dowel pin holes 431 are used. Every dowel pin hole 431 is followed by two bolt holes 421. Of course, other arrangements are also possible, such as e.g. having a dowel pin 431 hole after every bolt hole.

Figure 5:
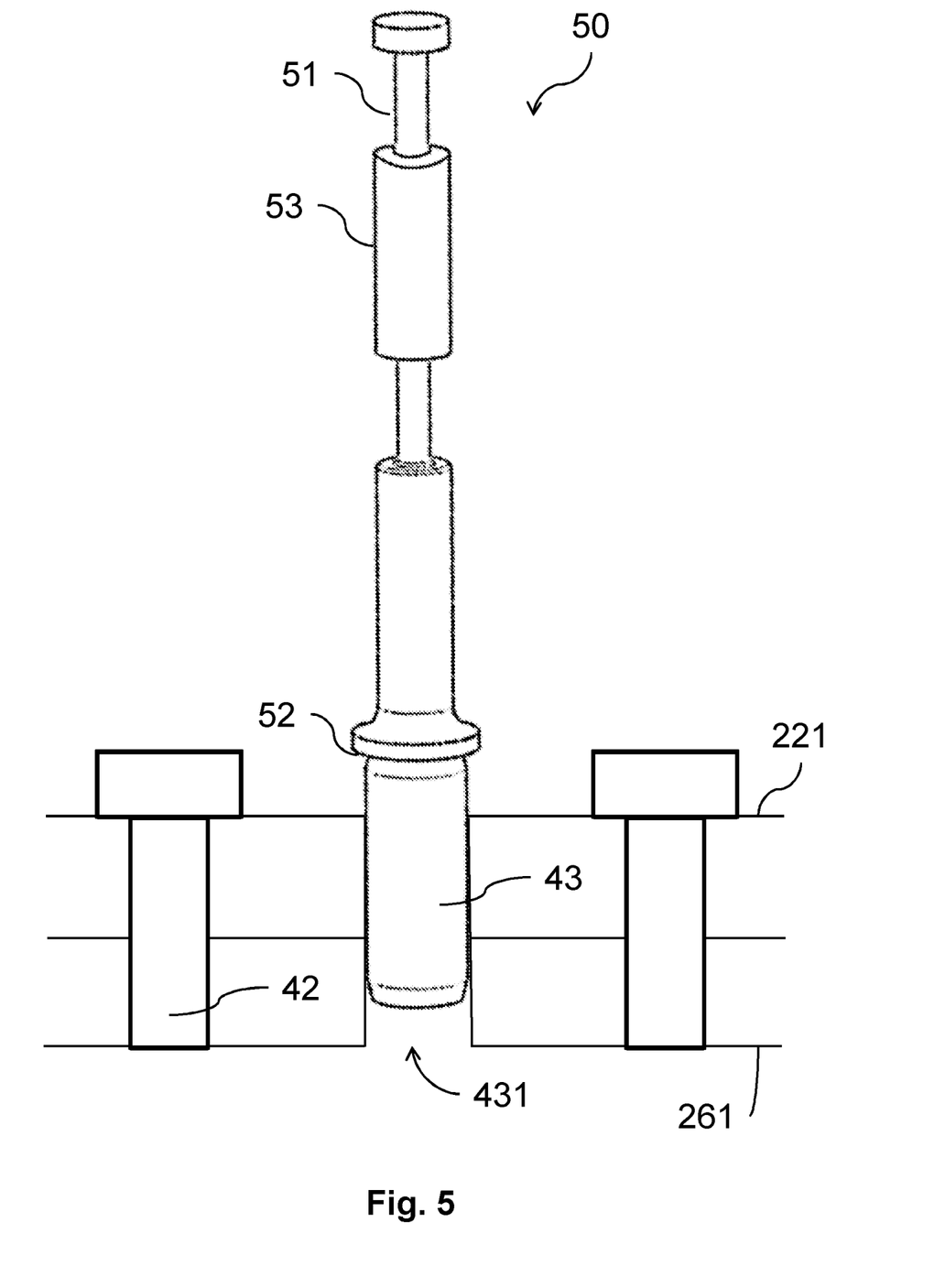
FIG. 5 shows a dowel pin being inserted in a dowel pin hole.

FIG. 5 shows a dowel pin 43 being inserted in a dowel pin hole 431. A guide tool 50 is used to grip and move the dowel pin 43 while it is inserted into the corresponding dowel pin holes 431 of the gearbox housing 22 and the coupling 26. In this figure, the dowel pin 43 inserted from the gearbox side, but depending on the gearbox design, it may be easier or just as easy to insert the dowel pins 43 from the other side. Before inserting the dowel pin 43 into the dowel pin holes 431, it may be cooled down in order to shrink to a size small enough to fit the holes 431. The cooling is, e.g., done by inserting the dowel pin 43 into a bath of liquid nitrogen or a different cryogen. Because the handling of liquid nitrogen is easier in a factory than in a nacelle on top of a wind turbine tower, the coupling housing 261 and the gearbox housing 221 are preferably already connected in a factory and then transported to the wind turbine as a single unit. Also other components, such as the generator 23 may already be connected in the factory. The guide tool 50 is then used to bring the dowel pin 43 to the dowel pin hole 431 and push it inside. If it's a very close fit, a slide hammer 53 optionally provided on the shaft 51 of the guide tool 53 can be used to hammer the dowel pin 43 down the hole 431. Of course, a similar job could be done using a normal hammer. A flat alignment surface 52 may be provided at the contact interface of the guide tool 50 with the dowel pin 43 in order to make sure that the dowel pin 43 is not pushed too deep into the dowel pin holes 431.

Figure 6:
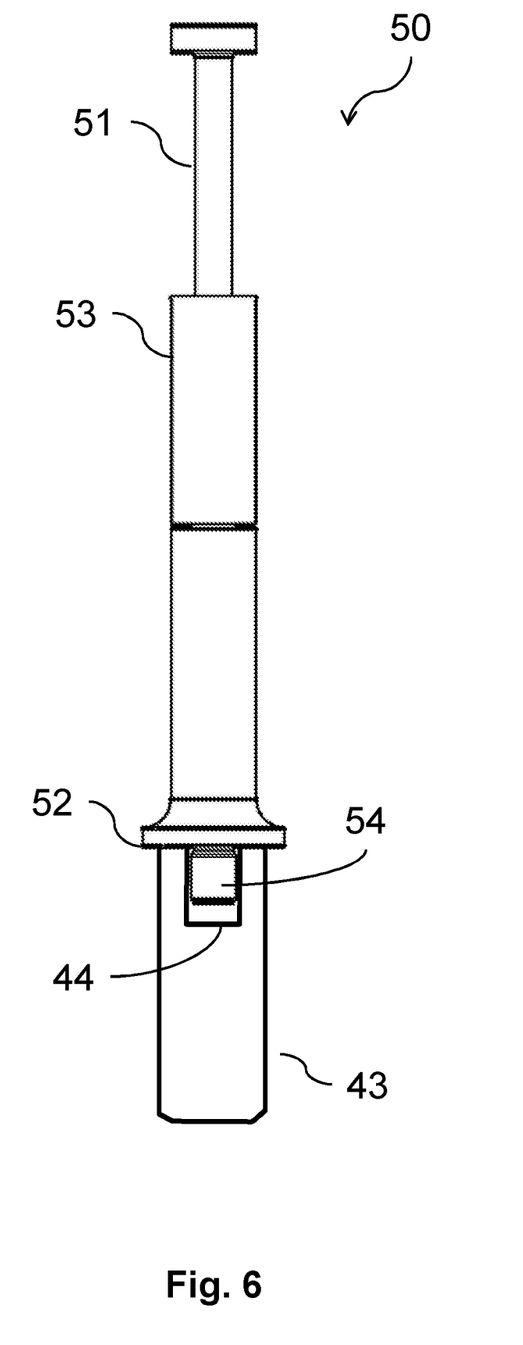
FIG. 6 shows a cross section of a dowel pin and a dowel pin guide tool.

FIG. 6 shows a cross section of a dowel pin 43 and a dowel pin guide tool 50. In addition to what has already been shown in and explained with reference to FIG. 5, this cross section also shows an engagement feature in the dowel pin 43 in the form of a recess 44. The recess 44 allows a gripping element 54 of the guide tool 50 to be inserted into and engage with the dowel pin 43. The recess 44 and the gripping element 54 may comprise cooperating threads or the gripping element may comprise magnetic material for holding onto the dowel pin 43. Alternatively or additionally, by selecting a suitable material for the gripping element, the gripping element may be shrink fitted to the dowel pin 43 upon insertion into the nitrogen bath. When warming up again after insertion into the dowel pin holes 431, the gripping element 54 and the recess 44 will return to their original sizes again allowing for easy removal of the guide tool 50 from the recess 44.

It will be appreciated that preferred and/or optional features of the first aspect of the invention may be combined with the other aspects of the invention. The invention in its various aspects is defined in the independent claims below and advantageous features are defined in the dependent claims below.

The invention claimed is:

1. A powertrain for a wind turbine, comprising:
   at least a first powertrain component and a second powertrain component, a rotating output of the first powertrain component being coupled to a rotating input of the second powertrain component;
   a powertrain housing enclosing the powertrain components, the powertrain housing comprising at least a first powertrain housing section enclosing at least part of the first powertrain component and a second powertrain housing section at least part of the second powertrain component; and
   a connection between the first and the second powertrain housing sections, comprising:
      a plurality of bolts installed in corresponding bolt holes of the first and the second powertrain housing sections, and
      a plurality of dowel pins installed in corresponding dowel pin holes of the first and the second powertrain housing sections, the dowel pins having been installed in the dowel pin holes by shrink fitting.

2. The powertrain for a wind turbine as claimed in claim 1, wherein the dowel pins comprise an engagement feature for allowing the dowel pin to be gripped by a guide tool when it is installed in the dowel pin holes.

3. The powertrain for a wind turbine as claimed in claim 1, wherein the shrink fitting comprises cooling the dowel pins.

4. The powertrain for a wind turbine as claimed in claim 1, wherein the plurality of bolts is arranged in a substantially circular arrangement around the rotating output and/or input.

5. The powertrain for a wind turbine as claimed in claim 4, wherein the first powertrain housing section and/or the second powertrain housing section comprise a substantially circular flange and wherein the plurality of bolts is arranged in the circular flange.

6. The powertrain for a wind turbine as claimed in claim 4, wherein at least some of the dowel pins are provided at a position in between two of the bolts.

7. The powertrain for a wind turbine as claimed in claim 6, wherein at least some of the dowel pins are provided at a position in between two pairs of the bolts.

8. The powertrain for a wind turbine as claimed in claim 6, wherein one of the dowel pins is provided between each pair of adjacent bolts.

9. The powertrain for a wind turbine as claimed in claim 1, wherein the second powertrain housing section is a gearbox housing and the first powertrain housing section is not a gearbox housing.

10. A method for connecting a first wind turbine powertrain component to a second wind turbine powertrain component, the method comprising the steps of:
    aligning the first powertrain component with the second powertrain component,
    inserting at least one bolt into a bolt hole in a first powertrain housing section enclosing at least part of the first powertrain component and into a corresponding bolt hole in a second powertrain housing section enclosing at least part of the second powertrain component,
    fastening the bolt,
    shrink fitting a dowel pin in a dowel pin hole in the first powertrain housing section and into a corresponding dowel pin hole in the second powertrain housing section.

11. The method as claimed in claim 10, wherein the shrink fitting comprises cooling the dowel pin.

12. The method as claimed in claim 11, wherein the shrink fitting comprises cooling the dowel pin with the use of a cryogen.

13. The method as claimed in claim 10, wherein the step of aligning comprises inserting at least one guide pin, already connected to the first powertrain housing section into a guide hole of the second powertrain housing section, or vice versa.

14. The method as claimed in claim 13, wherein
    the guide pin is connected to the first powertrain housing section by inserting the guide pin into a dowel pin hole of the first powertrain housing section,
    the guide hole is a corresponding dowel pin hole of the second powertrain housing section, and
    the method further comprises removing the guide pin from the dowel pin holes and shrink fitting a dowel pin therein.

15. A powertrain for a wind turbine, comprising:
    at least a first powertrain component and a second powertrain component, a rotating output of the first powertrain component being coupled to a rotating input of the second powertrain component;
    a powertrain housing enclosing the powertrain components, the powertrain housing comprising at least a first powertrain housing section enclosing at least part of the first powertrain component and a second powertrain housing section at least part of the second powertrain component; and
    a connection between the first and the second powertrain housing sections, comprising:
       a plurality of bolts installed in corresponding bolt holes of the first and the second powertrain housing sections, and
       a plurality of dowel pins installed in corresponding dowel pin holes of the first and the second powertrain housing sections, the dowel pins having been installed in the dowel pin holes by shrink fitting,
    wherein the second powertrain housing section is a gearbox housing and the first powertrain housing section is an intermediate powertrain housing section between a main bearing housing and the gearbox housing.

16. A powertrain for a wind turbine, comprising:
- at least a first powertrain component and a second powertrain component, a rotating output of the first powertrain component being coupled to a rotating input of the second powertrain component;
- a powertrain housing enclosing the powertrain components, the powertrain housing comprising at least a first powertrain housing section enclosing at least part of the first powertrain component and a second powertrain housing section at least part of the second powertrain component; and
- a connection between the first and the second powertrain housing sections, comprising:
  - a plurality of bolts installed in corresponding bolt holes of the first and the second powertrain housing sections, and
  - a plurality of dowel pins installed in corresponding dowel pin holes of the first and the second powertrain housing sections, the dowel pins having been installed in the dowel pin holes by shrink fitting,
- wherein the first powertrain component is a gearbox and the second powertrain component is a generator.

* * * * *

UNITED STATES PATENT AND TRADEMARK OFFICE
CERTIFICATE OF CORRECTION

PATENT NO. : 11,306,704 B2
APPLICATION NO. : 16/475870
DATED : April 19, 2022
INVENTOR(S) : Lars Skifter It is certified that error appears in the above-identified patent and that said Letters Patent is hereby corrected as shown below:

In the Specification

Column 6, Line 45, after "43" insert --is--.

In the Claims

Column 7, Claim 1, Line 36, after "section" insert --enclosing--.

Column 8, Claim 15, Line 53, after "section" insert --enclosing--.

Column 9, Claim 16, Line 10, after "section" insert --enclosing--.

Signed and Sealed this
Nineteenth Day of July, 2022

Katherine Kelly Vidal
*Director of the United States Patent and Trademark Office*